United States Patent
Schmid

(10) Patent No.: US 7,127,904 B2
(45) Date of Patent: Oct. 31, 2006

(54) REFRIGERATING APPLIANCE COMPRISING A REFRIGERATING COMPARTMENT, A COLD STORAGE COMPARTMENT AND A FREEZER COMPARTMENT

(75) Inventor: Eugen Schmid, Biberach-Mettenberg (DE)

(73) Assignee: Liebherr-Hausgeräte GmbH, Ochsenhausen (DE)

( * ) Notice: Subject to any disclaimer, the term of this patent is extended or adjusted under 35 U.S.C. 154(b) by 1028 days.

(21) Appl. No.: 10/182,154

(22) PCT Filed: Jan. 25, 2001

(86) PCT No.: PCT/EP01/00825

§ 371 (c)(1),
(2), (4) Date: Dec. 2, 2002

(87) PCT Pub. No.: WO01/55655

PCT Pub. Date: Aug. 2, 2001

(65) Prior Publication Data

US 2003/0131617 A1 Jul. 17, 2003

(51) Int. Cl.
*F25D 17/00* (2006.01)

(52) U.S. Cl. .............................. 62/180; 62/186; 62/519; 62/524

(58) Field of Classification Search .................... 62/180, 62/186, 515, 519, 524
See application file for complete search history.

(56) References Cited

U.S. PATENT DOCUMENTS

| | | | | |
|---|---|---|---|---|
| 3,992,171 A | * | 11/1976 | Jenewein ..................... | 62/419 |
| 4,353,223 A | * | 10/1982 | Dienemann ................... | 62/442 |
| 4,741,175 A | * | 5/1988 | Schulze ........................ | 62/442 |
| 5,255,530 A | | 10/1993 | Janke | |
| 5,433,086 A | * | 7/1995 | Cho et al. ..................... | 62/455 |
| 5,678,416 A | * | 10/1997 | Yoo et al. ..................... | 62/180 |
| 5,778,973 A | | 7/1998 | Shin | |
| 5,966,951 A | * | 10/1999 | Hallin et al. .................. | 62/141 |
| 5,996,361 A | * | 12/1999 | Bessler et al. ................ | 62/163 |
| 6,014,868 A | * | 1/2000 | Hirosawa et al. ............. | 62/407 |

FOREIGN PATENT DOCUMENTS

| | | |
|---|---|---|
| DE | 29603848 | 5/1997 |
| DE | 19647642 | 5/1998 |
| EP | 0326049 | 8/1989 |
| EP | 0758732 | 2/1997 |
| EP | 0793066 | 9/1997 |
| GB | 1094059 | 12/1967 |
| GB | 1485666 | 9/1977 |

* cited by examiner

*Primary Examiner*—William E. Tapolcai
*Assistant Examiner*—Mohammad M. Ali
(74) *Attorney, Agent, or Firm*—Dilworth & Barrese LLP

(57) ABSTRACT

A cooling appliance is provided with a refrigeration compartment, a cold storage compartment and a freezer compartment, which are separated from one another by partition walls and by at least one door or flap. A cooling air passage is associated with the refrigeration compartment and in its run-in region a cooling fan is arranged which sucks cooling air from the refrigeration compartment and its run-out opens into the cold storage compartment. Sections of a single evaporate are associated with the freezer compartment and the cooling air passage. Openings and/or gaps are provided in and/or between the partition wall and/or door which separate the refrigeration compartment from the cold storage compartment. A control or regulating device controls the running time and/or the speed of the compressor and/or the switched-on time and/or the speed of the cooling fan.

20 Claims, 1 Drawing Sheet

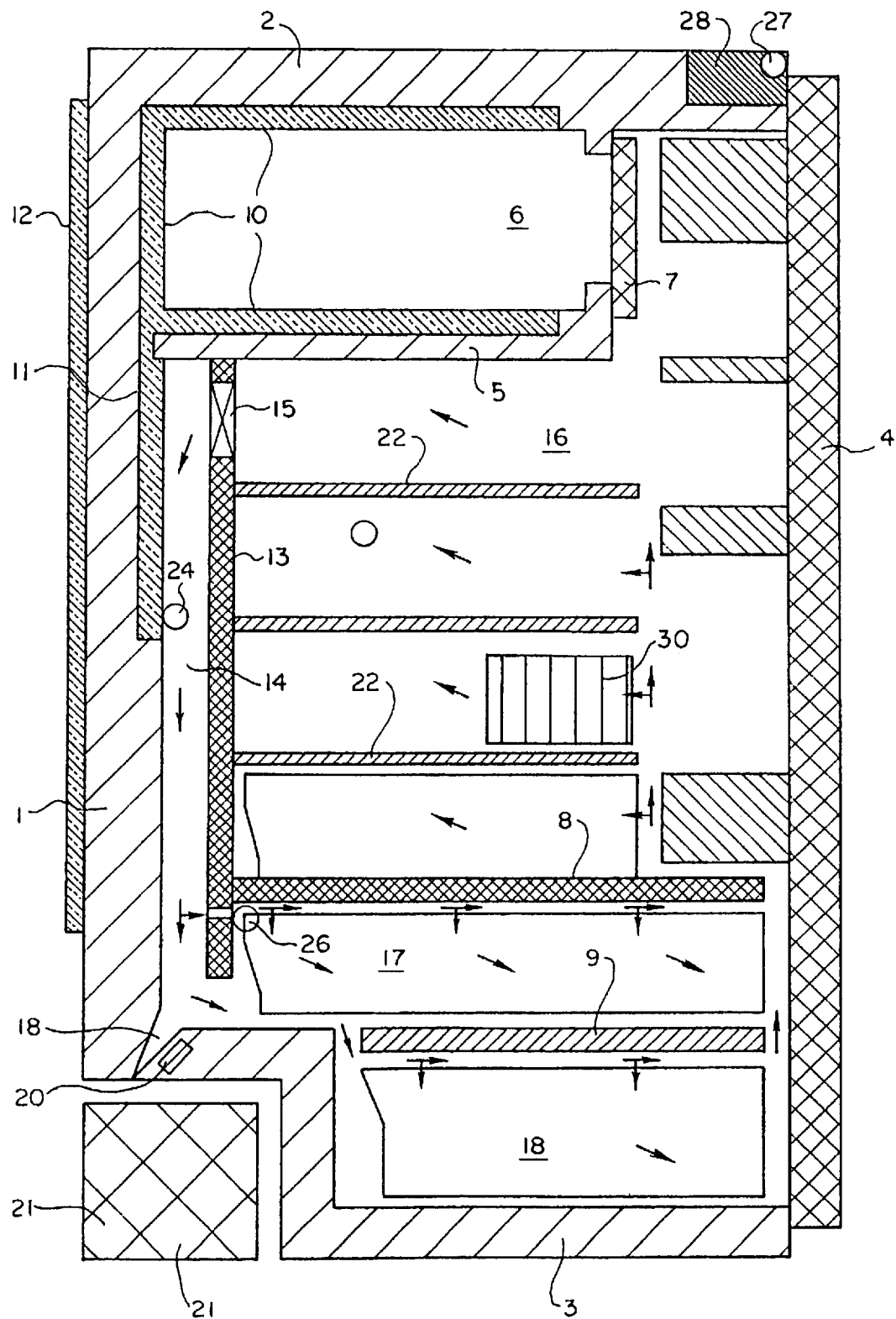
F I G . 1

REFRIGERATING APPLIANCE COMPRISING A REFRIGERATING COMPARTMENT, A COLD STORAGE COMPARTMENT AND A FREEZER COMPARTMENT

BACKGROUND OF THE INVENTION

The invention relates to a cooling appliance comprising a refrigeration compartment, a cold storage compartment and a freezer compartment which are separated from one another by partition walls and at least one door or flap.

A cooling appliance is known from EP 0 793 066 A2 comprising a refrigeration compartment and a cold storage compartment which are separated from one another by a horizontal partition wall and which are provided with at least one door or flap closing them. In this known refrigerator, a cooling fan is arranged in the upper region of the refrigeration compartment and a cooling air passage is separated off by a partition wall approximately parallel to the rear wall of the refrigeration compartment. An evaporator is disposed in said cooling air passage which opens into the cold storage compartment in the rear region of the partition wall. Openings or a gap are provided between the partition wall and the door in the front region of the partition wall through which the cold air enters into the refrigeration compartment. The coldness distribution in the refrigeration compartment and in the cold storage compartment is controlled by the running time of the compressor and/or by the switched-in time and/or the speed of the cooling fan.

Modern cooling appliances are usually additionally provided with a freezer compartment which is usually termed a four-star compartment.

Known appliances, which are additionally provided with a freezer compartment as well as a refrigeration compartment and a cold storage compartment, are provided with two or three evaporators and solenoid valves in order to control the different coldness requirements under the changing environmental conditions and conditions of use. To ensure a uniform temperature in the cold storage compartment, it is provided with a ventilator.

SUMMARY OF THE INVENTION

It is the object of the invention to provide a cooling appliance of the kind first stated which has a simpler design while dispensing with the solenoid valves.

This object is solved in accordance with the invention by a cooling appliance having the features herein.

This object is solved in accordance with the invention by a cooling appliance having the features of claim 1.

In the cooling appliance in accordance with the invention, the common evaporator for the refrigeration compartment, the cold storage compartment and the freezing compartment consists of a circuit board which is cut and bent such that the evaporator section for the freezer compartment can be arranged spatially separated from the evaporator section of the refrigeration compartment.

A cooling appliance comprising a refrigeration compartment and a freezer compartment whose evaporator consists of two evaporation sections connected in series, of which one section is associated with the freezer compartment and one section with the refrigeration compartment, is known for example from EP 0 758 732 A2.

The evaporator section arranged in the cooling air passage effects the cooling of the refrigeration compartment and of the cold storage compartment, with the cooling and the control of the cold performance generally taking place in the manner described in EP 0 793 066 A2.

To additionally ensure the maintenance of the temperature in the freezer compartment, which can be a 4-star compartment, in a preferred embodiment, the ventilator is selected with a variable speed in dependence on the environmental temperature. At a low environmental temperature, the coldness requirement of the refrigeration part falls so that the speed and/or the running time of the cooling fan is reduced. In this way, the evaporation temperature also falls. This lower evaporation temperature brings about a higher coldness performance of the associated evaporator section in the freezer compartment. This in turn has the result that the temperatures in the freezer compartment which are lower than −18° C. are also observed at lower environmental temperatures despite reduced compressor running times and/or compressor speeds.

If it is found that the temperature in the freezer compartment nevertheless increases in an unpermitted manner due to low environmental temperatures, a thermal load, that is a heater, can also be arranged in the refrigeration compartment or in the cold storage compartment to thereby increase the compressor running times.

To monitor the temperatures, temperature sensors can be provided for one or both evaporator sections, for the refrigeration compartment and for the cold storage compartment. The measured results of the temperature sensors can be supplied to control electronics, which preferably include a micro-processor, which then control the running times and/or speed of the ventilator and the running time and/or speed of the compressor.

BRIEF DESCRIPTION OF THE DRAWINGS

An embodiment of the invention will be explained in more detail in the following with reference to the drawing in whose single FIGURE a vertical section is shown through a cooling appliance comprising a refrigeration compartment, a cold storage compartment and a freezer compartment.

DESCRIPTION OF THE PREFERRED EMBODIMENTS

The cooling appliance consists of a cupboard-like body part 1 comprising a rear wall, a top wall 2 and a base 3 which are provided with usual insulations. The cupboard part 1 can be closed in a usual manner by a door 4. A freezer compartment 6, whose opening can be closed by a door 7, is separated off in a usual manner from the interior of the body part 1 by a partition wall 5. A cold storage compartment is separated off by a horizontal partition board 8 in the base region of the interior. The cold storage compartment is sub-divided in the manner shown by a further partition wall 9 into a dry cold storage compartment and a moisture-dry cold storage compartment with temperatures in the region from 0° C. to 3° C.

Only one single evaporator is provided for the cooling appliance. It is bent and shaped from a usual circuit board. A section 10 of the evaporator bent into a U shape is associated with the freezer compartment 6. A coldness distribution section 11 is foamed in a usual manner into the rear wall of the body part. The U-shaped evaporator section 10 can also be foamed into the insulation in the manner shown.

The condenser 12 is arranged in a usual manner at the rear wall of the body part.

A vertical partition board 13, which is parallel to the rear wall and bounds a cooling air passage 14 with the rear wall, is arranged beneath the partition wall 5 separating off the freezer compartment. In its upper region, the vertical partition board 13 is provided with an opening in which a cooling air fan 15 is arranged which sucks in cold air from the refrigeration compartment 16 and blows it into the cooling air passage 14. The cooling air passage 14 opens beneath the horizontal partition board 8 into the cold storage compartment with the cold storage compartment parts 17, 18.

At the lower end of the cooling air passage 14, a condensate channel 19 is arranged which can be heated by an electrical condensate channel heater 20 or by a heat deflection plate. Condensate collecting in the condensate channel 19 is led to a vessel arranged on the compressor 21 in which it can evaporate.

The refrigeration compartment 16 is provided in a usual manner with insertable trays 22 for the wares to be refrigerated.

A temperature sensor 24, which measures the evaporator temperature of the evaporator section 11, is arranged in the region of the evaporator section 11 which is arranged in the coolant air passage 14.

A temperature sensor 25 is arranged in the refrigeration compartment 16.

A temperature sensor 26 is provided in the cold storage compartment 17, 18.

Furthermore, a temperature sensor 27 is disposed at the body part to measure the environmental temperature.

The measured values of the temperature sensors 24 to 27 are supplied to control electronics 28 which are preferably provided with a micro-computer and which control the speed and/or the switched-on time of the cooling air fan 15 and the running time and/or speed of the compressor 21 in accordance with a pre-set program on the basis of the temperatures measured in accordance with the required coldness performance in the individual compartments.

The cooling air flow produced by the cooling fan 15 which initially enters from the cooling air passage 14 through openings and gaps into the cold storage compartment. 17, 18 and which reaches from this through gaps formed between the partition boards and the door into the refrigeration compartment and which flows around its compartments, is made visible by the entered arrows and double arrows.

What is claimed is:

1. A cooling appliance comprising a refrigeration compartment, a cold storage compartment and a freezer compartment (16, 17, 18, 6), which are separated from one another by partition walls (5, 8) and by at least one door (4) or flap, comprising
    an associated cooling air passage (14) in the refrigeration compartment (16) in whose run-in region a cooling fan (15) is arranged which sucks cooling air from the refrigeration compartment (16) and whose run-out opens into the cold storage compartment (17, 18),
    a single evaporator of which one section (10) is associated with the freezer compartment (6) and one section (11) is associated with the cooling air passage (14),
    at least one of openings and gaps, positioned at least one of in between at least one of the partition wall (8) and door (4) which separate the refrigeration compartment (16) from the cold storage compartment (17, 18),
    an environmental temperature sensor (27), and
    a control or regulating device (28) which controls at least one of the switched-on time and the speed of the cooling fan (15) the speed of the cooling fan (15) in dependence on the environmental temperature measured with the environmental temperature sensor (27).

2. A cooling appliance in accordance with claim 1, wherein the control or regulating device (28) additionally controls the running time and/or the speed of the compressor (21).

3. A cooling appliance in accordance with claim 1, wherein the cooling air passage (14) is formed between the rear wall of the refrigeration compartment (16) and a partition wall (13) parallel to this.

4. A cooling appliance in accordance with claim 1, wherein the refrigeration compartment is sub-divided by a partition wall (9) provided with the openings and/or gaps.

5. A cooling appliance with in accordance with claim 1, wherein a refrigeration compartment air sensor (25) is provided.

6. A cooling apparatus in accordance with claim 1, wherein a temperature sensor (24) is provided for the evaporator section (11) arranged in the cooling passage.

7. A cooling appliance in accordance with claim 1, wherein a temperature sensor (26) is provided for the cold storage compartment (17, 18).

8. A cooling appliance in accordance with claim 1, wherein a device (30) forming a thermal load is arranged in the refrigeration compartment.

9. A cooling appliance in accordance with claim 1, characterized by a condensate channel which can be heated by an electrical condensate channel heater or by a heat deflection plate.

10. A cooling appliance in accordance with claim 2, wherein the cooling air passage (14) is formed between the rear wall of the refrigeration compartment (16) and a partition wall (13) parallel to this.

11. A cooling appliance in accordance with claim 2, wherein the refrigeration compartment is sub-divided by a partition wall (9) provided with the openings and/or gaps.

12. A cooling appliance in accordance with claim 3, wherein the refrigeration compartment is sub-divided by a partition wall (9) provided with the openings and/or gaps.

13. A cooling appliance with in accordance with claim 2, wherein a refrigeration compartment air sensor (25) is provided.

14. A cooling appliance with in accordance with claim 3, wherein a refrigeration compartment air sensor (25) is provided.

15. A cooling appliance with in accordance with claim 4, wherein a refrigeration compartment air sensor (25) is provided.

16. A cooling apparatus in accordance with claim 2, wherein a temperature sensor (24) is provided for the evaporator section (11) arranged in the cooling passage.

17. A cooling apparatus in accordance with claim 3, wherein a temperature sensor (24) is provided for the evaporator section (11) arranged in the cooling passage.

18. A cooling apparatus in accordance with claim 4, wherein a temperature sensor (24) is provided for the evaporator section (11) arranged in the cooling passage.

19. A cooling apparatus in accordance with claim 5, wherein a temperature sensor (24) is provided for the evaporator section (11) arranged in the cooling passage.

20. A cooling appliance in accordance with claim 2, wherein a temperature sensor (26) is provided for the cold storage compartment (17, 18).

* * * * *